(12) United States Patent
Lee et al.

(10) Patent No.: US 9,749,699 B2
(45) Date of Patent: Aug. 29, 2017

(54) DISPLAY DEVICE, SERVER DEVICE, VOICE INPUT SYSTEM AND METHODS THEREOF

(71) Applicant: SAMSUNG ELECTRONICS CO., LTD., Suwon-si (KR)

(72) Inventors: Hee-ran Lee, Suwon-si (KR); Yong-wook Shin, Osan-si (KR); Sung-wook Choi, Suwon-si (KR); Seung-min Shin, Bucheon-si (KR); Sung-pil Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 41 days.

(21) Appl. No.: 14/584,714

(22) Filed: Dec. 29, 2014

(65) Prior Publication Data

US 2015/0189391 A1    Jul. 2, 2015

(30) Foreign Application Priority Data

Jan. 2, 2014   (KR) .................. 10-2014-0000074

(51) Int. Cl.
*H04N 5/445* (2011.01)
*H04N 21/482* (2011.01)
(Continued)

(52) U.S. Cl.
CPC ..... *H04N 21/4828* (2013.01); *G06F 17/2795* (2013.01); *G06F 17/30976* (2013.01); *G10L 25/54* (2013.01); *H04N 21/42203* (2013.01); *H04N 21/4755* (2013.01); *H04N 21/4826* (2013.01); *G10L 15/26* (2013.01)

(58) Field of Classification Search
CPC ......... H04N 21/4722; H04N 21/47214; H04N 7/17318

USPC ................ 725/51–53, 60, 61; 709/217–232; 707/784
See application file for complete search history.

(56) References Cited

U.S. PATENT DOCUMENTS 7,467,398 B2 * 12/2008 Fellenstein ............ H04N 7/163
                                                          348/E7.061
7,797,204 B2 *  9/2010 Balent .................. G06Q 10/087
                                                          705/26.8
(Continued)

FOREIGN PATENT DOCUMENTS

WO        2011/039773 A2     4/2011

OTHER PUBLICATIONS

Search Report dated Feb. 16, 2015 issued in International Application No. PCT/KR2014/011870 (PCT/ISA/210).
(Continued)

*Primary Examiner* — Annan Shang
(74) *Attorney, Agent, or Firm* — Sughrue Mion, PLLC

(57) ABSTRACT

A server apparatus is disclosed. The server apparatus includes a communicator configured to receive a text which corresponds to a voice signal input, and a controller configured to, in response to a keyword, which corresponds to the text, not existing from among a keyword included in a mapping table, search for content information belonging to at least one content genre mapped with a synonym of the text, provide a search result to a display apparatus through the communicator, and update the mapping table by adding the synonym as the keyword. Accordingly, the server apparatus may effectively perform search for content information according to voice input.

17 Claims, 11 Drawing Sheets

(51) Int. Cl.
*H04N 21/475* (2011.01)
*H04N 21/422* (2011.01)
*G06F 17/27* (2006.01)
*G10L 25/54* (2013.01)
*G06F 17/30* (2006.01)
*G10L 15/26* (2006.01)

(56) References Cited

U.S. PATENT DOCUMENTS

| | | | | |
|---|---|---|---|---|
| 8,099,434 | B2* | 1/2012 | Ramer | G06F 17/30867 |
| | | | | 707/784 |
| 8,260,809 | B2* | 9/2012 | Platt | G06F 17/276 |
| | | | | 707/771 |
| 8,307,391 | B2* | 11/2012 | Fujiwara | G06F 17/30672 |
| | | | | 725/36 |
| 8,655,666 | B2* | 2/2014 | Sureka | G10L 15/193 |
| | | | | 348/14.05 |
| 2006/0236343 | A1* | 10/2006 | Chang | H04N 5/44543 |
| | | | | 725/61 |
| 2007/0201446 | A1 | 8/2007 | Wright | |
| 2009/0018832 | A1 | 1/2009 | Mukaigaito et al. | |
| 2009/0070850 | A1* | 3/2009 | Lee | H04N 5/44508 |
| | | | | 725/131 |
| 2009/0138906 | A1* | 5/2009 | Eide | G06F 17/30038 |
| | | | | 725/32 |
| 2009/0258333 | A1* | 10/2009 | Yu | G09B 5/04 |
| | | | | 434/157 |
| 2010/0076763 | A1* | 3/2010 | Ouchi | 704/246 |
| 2010/0094878 | A1* | 4/2010 | Soroca | G06F 17/30035 |
| | | | | 707/748 |
| 2010/0306249 | A1* | 12/2010 | Hill | G06F 17/30867 |
| | | | | 707/769 |
| 2010/0306805 | A1* | 12/2010 | Neumeier | H04N 5/44591 |
| | | | | 725/60 |
| 2011/0099157 | A1* | 4/2011 | LeBeau | H04M 1/72533 |
| | | | | 707/706 |
| 2011/0145874 | A1* | 6/2011 | Bi | H04N 21/478 |
| | | | | 725/110 |
| 2011/0265118 | A1* | 10/2011 | Choi | H04N 5/4401 |
| | | | | 725/37 |
| 2011/0283324 | A1 | 11/2011 | Oh | |
| 2011/0289530 | A1* | 11/2011 | Dureau | H04N 21/4622 |
| | | | | 725/38 |
| 2012/0042343 | A1* | 2/2012 | Laligand | H04N 21/23433 |
| | | | | 725/53 |
| 2013/0080289 | A1* | 3/2013 | Roy | G06Q 10/10 |
| | | | | 705/26.8 |
| 2013/0145400 | A1* | 6/2013 | Chang | H04N 21/42203 |
| | | | | 725/53 |
| 2013/0211836 | A1* | 8/2013 | Jordan | H04N 21/4782 |
| | | | | 704/246 |
| 2014/0280121 | A1* | 9/2014 | Sharp | G06F 17/3053 |
| | | | | 707/732 |
| 2014/0304505 | A1* | 10/2014 | Dawson | G06F 21/6227 |
| | | | | 713/165 |

OTHER PUBLICATIONS

Written Opinion dated Feb. 16, 2015 issued in International Application No. PCT/KR2014/011870 (PCT/ISA/237).

* cited by examiner

| KEYWORD | CONTENT GENRE | SCORE |
|---|---|---|
| KILLING | HORROR | 1.1 |
| KILLING | COMEDY | 1.0 |
| KILLING | MELODRAMA | 0.5 |
| KILLING | EROTICISM | 1.0 |
| KILLING | ACTION | 0.8 |
| HORRIBLE | HORROR | 1.2 |
| HORRIBLE | ACTION | 0.8 |
| HORRIBLE | COMEDY | 0.7 |

FIG. 4

| GROUP NO | SYNONYM |
| --- | --- |
| 1 | FUNNY, INTERESTING, RIDICULOUS, HILARIOUS, |
| 2 | HORRIBLE, HORRIFYING |
| 3 | BEAUTIFUL, SAD, LOVELY, CALM, QUIET, PATHETIC, WEEPY |
| 4 | KILLING, KILLER, AWESOME |
| | ⋮ |

| CONTENT TYPE | SCORE | PRIORITY |
|---|---|---|
| MOVIE | 2.0 | 1 |
| TV DRAMA | 1.8 | 2 |
| NEWS | 0.5 | 6 |
| PHOTO | 0.8 | 4 |
| MUSIC VIDEO | 0.7 | 5 |
| MUSIC | 1.6 | 3 |

133

DISPLAY DEVICE, SERVER DEVICE, VOICE INPUT SYSTEM AND METHODS THEREOF

CROSS-REFERENCE TO RELATED APPLICATION

This application claims priority from Korean patent application No. 10-2014-0000074, filed on Jan. 2, 2014, in the Korean Intellectual Property Office, the entire disclosure of which is hereby incorporated by reference in its entirety.

TECHNICAL FIELD

Apparatuses, systems, and methods consistent with exemplary embodiments relate to a display apparatus which searches for and provides content information according to a voice signal, and also relate to a server apparatus, a voice input system, and a method for controlling a content thereof.

BACKGROUND

Development in electronic technology enabled development and distribution of various types of electronic apparatuses. More particularly, various types of electronic apparatuses including a television (TV) are now available at home. These electronic apparatuses have more various functions according to needs of a user.

For example, a TV may be connected to the Internet and provide Internet services. Further, a user may view a lot of digital broadcasting channels through a TV.

Accordingly, controlling methods which enable more convenient use of various functions of a display apparatus are used. For example, recently, a display apparatus which recognizes a user voice and is controlled by the recognized voice has been developed.

However, there is a drawback in the conventional arts that, when a new keyword other than a prestored keyword is spoken, the new keyword may not be searched appropriately.

In view of the above, there is a necessity to develop technology to search for and provide content information suitable to a user's intention.

SUMMARY

One or more exemplary embodiments provide a display apparatus which may efficiently search for and provide content information according to a user's voice signal, a server apparatus, a voice input system including the display apparatus, and a method for providing a content thereof.

According to an aspect of an exemplary embodiment, there is provided, a server apparatus including a communicator configured to receive a text which corresponds to a voice signal, and a controller configured to, in response to a keyword, which corresponds to the text, not existing from among at least one keyword included in a mapping table, search for content information belonging to a content genre mapped with a synonym of the text, provide a search result to a display apparatus through the communicator, and update the mapping table by adding the synonym as the keyword.

The mapping table may be a table in which at least one keyword and at least one content genre in combination may be mapped, wherein the controller, in response to a plurality of content genres being mapped regarding the synonym, may select at least one content genre according to a priority determined regarding the plurality of content genres, and search for content information belonging to the selected content genre The controller, according to a number of user selection on content information belonging to the at least one content genre, may adjust a score of the plurality of content genres, and update the mapping table by re-setting the priority according to the adjusted score.

The controller, in response to the keyword, which corresponds to the text, existing from among keywords registered in the mapping table, may search for content information belonging to a content genre mapped with the keyword and provides the content information to the display apparatus, and may upwardly adjust a score of the content genre mapped with the keyword.

The mapping table may be a mapping table which is individually generated and stored for a plurality of pre-registered users, wherein the controller may receive via the display apparatus user information which inputs the voice signal, and may search for the content information based on the mapping table which corresponds to the user information.

According to an exemplary embodiment, a method for providing content information of a server apparatus includes receiving a text which corresponds to a voice signal, searching for a keyword which corresponds to the text at a mapping table in which a keyword and a content genre are mapped with each other, in response to the keyword, which corresponds to the text, not existing, searching for content information belonging to the content genre mapped with a synonym of the text and transmitting a search result to a display apparatus, and updating the mapping table by adding the synonym as the keyword.

The transmitting the search result to the display apparatus may include, in response to a plurality of content genres being mapped with respect to the synonym in the mapping table, selecting at least one content genre according to a priority determined regarding the plurality of content genres, and searching content information belonging to the at least one selected content genre and transmitting the search result to the display apparatus.

The method may further include, according to a number related to user selection of content information belonging to the at least one content genre, adjusting a score of the plurality of content genres and updating the mapping table by re-setting the priority according to the adjusted score.

The method may further include, in response to the keyword, which corresponds to the text, existing from among keywords registered in the mapping table, providing content information belonging to the content genre mapped with the keyword to the display apparatus, and upwardly adjusting a score of the content genre mapped with the keyword.

The mapping table may be a mapping table which is individually generated and stored for a plurality of pre-registered users.

A voice input system according to an exemplary embodiment includes a display apparatus configured to receive a voice signal, a text conversion server configured to, in response to the voice signal being transmitted from the display apparatus, convert the voice signal to a text, and a server apparatus configured to search for content information corresponding to the text using a mapping table in which a keyword and a content genre are mapped with each other, and provide the information to the display apparatus, wherein the server apparatus, in response to the keyword, which corresponds to a text, not existing at the mapping table, searches for content information belonging to a content genre which corresponds to a text synonym, provides a search result to the display apparatus, and updates the mapping table by adding the synonym as the keyword.

The mapping table may be a table in which at least one keyword and at least one content genre in combination may be mapped, wherein the server apparatus, in response to a plurality of content genres being mapped regarding the synonym, may select at least one content genre according to a priority determined regarding the plurality of content genres, and may transmit content information belonging to the selected at least one content genre to the display apparatus.

The display apparatus may display the content information, and in response to the at least one content information being selected, may notify the selected at least one content information to the server apparatus, wherein the server apparatus may adjust a score on a content genre to which the selected content information belongs, according to the notice of the display apparatus and may update the mapping table.

The server, in response to the keyword, which corresponds to the text, existing from among keywords registered in the mapping table, may provide content information belonging to the content genre mapped with the keyword to the display apparatus, and may upwardly adjust a score of the content genre mapped with the keyword.

The mapping table may be a mapping table which is individually generated and stored for a plurality of pre-registered users, and wherein the server apparatus may receive at the display apparatus user information related to the voice signal, and may search for the content information based on the mapping table which corresponds to the user information.

According to another exemplary embodiment, a display apparatus may include a voice inputter configured to receive a voice signal, a text converter configured to convert the voice signal to a text, a communicator configured to perform communication with an external apparatus, a controller configured to, in response to a keyword, which corresponds to the text from among at least one keyword included in a mapping table, existing, search for content information belonging to the content genre mapped with the keyword via the external apparatus, and in response to a keyword, which corresponds to the text from among the at least one keyword included in a mapping table, not existing, the controller is configured to search for a synonym of the text and search for content information belonging to the content genre corresponding to the synonym from the external apparatus, and a display configured to display the content information, wherein the controller, in response to a search being performed based on the synonym, may add the synonym as the keyword and may update the mapping table.

The above-described server apparatus may further comprise a storage configured to store the mapping table in which the keyword and the content genre are mapped with each other.

The voice signal of the server apparatus may be input at the display apparatus.

The method as claimed in claim 6, wherein the voice signal is input at the display apparatus.

The above-described display apparatus may further comprise a storage configured to store the mapping table in which the keyword and the content genre are mapped with each other.

According to the various exemplary embodiments as described above, even if a user inputs an arbitrary voice signal, content information which corresponds to the voice signal may be efficiently searched and provided. Therefore, user convenience may be improved.

BRIEF DESCRIPTION OF THE DRAWINGS

The above and/or other aspects will be more apparent by describing in detail exemplary embodiments, with reference to the accompanying drawings, in which:

FIG. 4 is a view illustrating an example of a synonym table, FIG. 6 is a view illustrating an example of a content type table.

DETAILED DESCRIPTION

Figure 1:
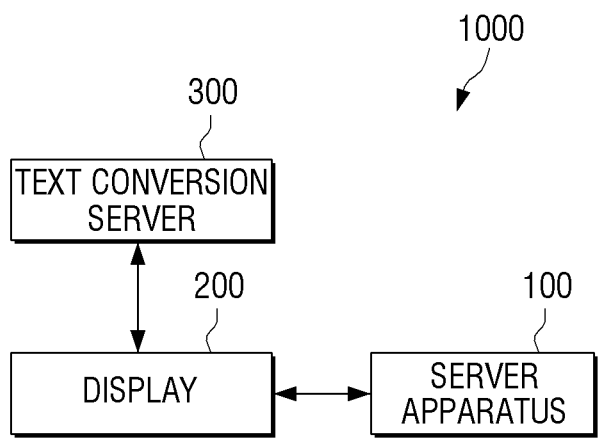
FIG. 1 is a block diagram illustrating the configuration of a voice input system according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a block diagram illustrating the configuration of a voice input system according to an exemplary embodiment. According to FIG. 1, a voice input system 1000 includes a server apparatus 100, a display apparatus 200, and a text conversion server 300.

The display apparatus 200 may be implemented with various types of apparatuses such as a TV, a personal computer (PC), a lap top PC, a mobile phone, a tablet PC, a personal digital assistant (PDA), MPEG audio layer-3 (MP3) player, an electronic frame, and kiosk. The display apparatus 200 may receive various voice signals.

When implemented as the voice input system as illustrated in FIG. 1, the display apparatus 200 may include a conversation client module (not illustrated) which may be interlocked with the text conversion server 300 and the server apparatus 200, or the like. The display apparatus 200, when the voice input mode resumes, may execute a conversation client module and perform a control operation which corresponds to voice input. To be specific, the display apparatus 200, when a voice signal of a user is input, may transmit the signal to the text conversion server 300.

The text conversion server 300 means a kind of a server apparatus which converts user voice transmitted through the display apparatus 200 into a text and provides the converted user voice.

The text conversion server 300 may recognize voice by using at least one of various recognition algorithms such as a dynamic time warping method, a hidden markov model, and a neural network, and may convert recognized voice into a text. For example, when using the hidden markov model, the text conversion server 300 performs modeling of changes in user voice by time and changes in spectrum respectively, and detects similar words from a stored language database. Accordingly, the detected words may be output as a text.

The display apparatus 200, when there is a voice command which coincides with a text from among a preset voice command, may perform an operation which corresponds to the voice command. For example, while voice commands such as power on, power off, channel up, channel down, volume up, and volume down are preset, when a voice signal which corresponds to the voice command is input, the display apparatus 200 may power on or off according to the voice command, or perform control operations such as channel up/down and volume up/down.

In case of a general text instead of a preset voice command, the display apparatus 200 transmits a text input from the text conversion server 300 to the server apparatus 100.

The server apparatus 100, by using a mapping table in which keywords and content genres are mapped with each other, may search for content information which corresponds to the transmitted text and send a search result to the display apparatus 200.

The server apparatus 100, when a keyword which corresponds to a text that does not exist in a mapping table, may search for a synonym of a text and provide content information belonging to a content genre which corresponds to a searched synonym to the display apparatus 200. The server apparatus 100 may search for a synonym which corresponds to a text from its own database (not illustrated) or an external apparatus. For example, the server apparatus 100 may have database which records various adjectives for expressing a content genre, a synonym thereof, dialect, a full name of a genre, a nickname, abbreviation, or the like. The server apparatus 100, from this database, may select a synonym which corresponds to the text. Or, the server apparatus 100 may transmit the text to various external apparatuses such as a web server, a cloud server, an external database, or the like, and search for a synonym which corresponds to the text.

The display apparatus 200 may display content information provided from the server apparatus 100. When a user selects one of the displayed content information, the display apparatus 200 may play and output a content which corresponds to the selected content information. The content information may include a thumbnail image on the content, title information, address information from which the corresponding content may be obtained, and other various information. The display apparatus 200, when address information is included in the selected content information, may access a source apparatus which corresponds to the address information and receive a content. If, the content information is about a broadcasting program content, the display apparatus 200 by using its own tuner (not illustrated) or a connected broadcasting receiving apparatus (for example, a set top box), may tune a corresponding broadcasting channel and then receive a broadcasting program content through the tuned broadcasting channel.

The server apparatus 100, when searching for content information by using a synonym of a keyword, may add the synonym as a keyword of a mapping table. For example, the display apparatus 200, when one of the searched content information is selected by a synonym, may notify the selected content information to the server apparatus 100. The server apparatus 100 may map a synonym with a genre of the selected content information, and update a mapping table.

Meanwhile, the mapping table may be prepared separately by individuals. For example, the server apparatus 100 may store a mapping table which is individually generated for a plurality of pre-registered users. In this case, the display apparatus 200, when a user logs in, may provide user information for a log-in user to the server apparatus 100. In user information, various information such as a user name, ID, and a password may be included. The server apparatus 100 may search for content information based on a mapping table which corresponds to user information transmitted from a display apparatus. That is, when there are several members in a family, various expressions may be used for the same one genre in accordance with each member's gender, age, living habits, interested fields, job, or the like. For example, in case of an adult man, he may express a sport genre as "awesome," and in case of an under-aged woman, she may express a melodrama as "awesome." In still another exemplary embodiment, mapping tables may be individually prepared for each user, and an expression which each user frequently uses may be registered as a keyword. Accordingly, an expression and a content genre of each user may be differently mapped by respective mapping tables.

Figure 2:
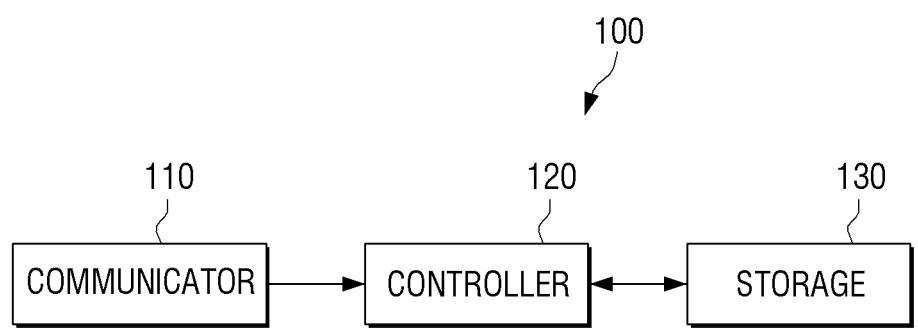
FIG. 2 is a block diagram illustrating the configuration of a server apparatus according to an exemplary embodiment.

FIG. 2 is a block diagram illustrating the configuration of a server apparatus according to an exemplary embodiment. In FIG. 2, the server apparatus 100 may be used for the voice input system 1000 as shown FIG. 1. The server apparatus 100 may be operated by a Manufacturer of the display apparatus 200, a content manufacturer, or other business providers.

According to FIG. 2, the server apparatus 100 includes the communicator 110, the controller 120, and the storage 130.

The communicator 110 is an element to receive a text which corresponds to a voice signal input at the display apparatus 200. The communicator 110 may directly receive a text from the display apparatus 200, or receive a text from the text conversion server 300 which converts the voice signal into a text.

The storage 130 is an element where a mapping table which maps a keyword with a content genre is stored. In FIG. 2, it has been illustrated that the storage 130 is included in the server apparatus 100, but according to the exemplary embodiments, it may be a database which is separately provided outside the server apparatus 100.

A mapping table includes each content genre and keywords to express the content genre. The content genre may include various genres such as horror, comedy, melodrama, eroticism genre, fantasy, action, or the like. In the mapping table, information on a content type may also be included. A content type may include a movie, a TV drama, news, a photograph, a music video, and a music file.

Figure 3:
FIG. 3 is a view illustrating an example of a mapping table.

FIG. 3 is an example of a mapping table. According to FIG. 3, in the mapping table 131, various keywords such as "killing" and "horrible", and a content genre are recorded. Further, a score is assigned for a mapping relation between a keyword and a content genre. In FIG. 3, it has been illustrated that a plurality of content genres are mapped with one keyword, but mapping relations between a keyword and a content genre may be combined in a diverse manner.

The controller 120 may assign priority for a mapping relation between each keyword and a content genre according to an assigned score. It has not been illustrated in the mapping table 131 of, but information on priority may also be included in the mapping table 131.

According to, for a keyword "killing," content genres such as horror, comedy, melodrama, eroticism, and action may be mapped, and according to scores of each genre, horror has the highest priority, and a melodrama has the lowest priority.

The controller 120, when a text is received through the communicator 110, may analyze the text and determines whether or not there is a keyword which includes the text from among the keywords included in the mapping table 131.

For example, when a user mentions "a killing movie", then the controller 120 may detect "killing" from the text and check that there is the detected keyword "killing" in the mapping table 131. Accordingly, the controller 120 determines that a content genre which corresponds to the keyword is horror, comedy, melodrama, eroticism, and action. The controller 120 may select genres whose priority is more than a particular priority, search for content information belonging to the selected genres, and provide the information to the display apparatus 200. Or, if there is little content information belonging to genres having a higher priority, content information on the genres having lower priority may be provided together.

For example, when priority at a mapping table in the is set to the third priority, the controller 120 may search for content information belonging to horror, comedy, and eroticism having higher priority from metadata database. Metadata database may be stored in the storage 130, or may be the database which is separately provided outside the server apparatus 100. In the metadata database, various information such as a content genre, titles of contents belonging to each content genre, a thumbnail image, content provider information, validity date, playing time, download expense, summary, and information on a character may be recorded. The controller 120, from among content information belonging to the selected content genre, may select information on a content having higher download frequency or content information having a certain number in the order of the latest date, and provide the information to the display apparatus 200.

In addition, searching orders may be diverse. For example, search may be performed repeatedly according to whether or not there is a search result. As the aforementioned example, when a user "a killing movie," the controller 120 may perform search by using the keyword told by a speaker. That is, by using a text "killing," and a text "movie," a user may perform search. The controller 120, when there is no search result, the search result is less than a certain number, or a user does not select a search result, may add a horror genre having the top priority, from among the content genres corresponding to "killing," based on the mapping table, to a search keyword. Accordingly, the controller 120 may perform search regarding a movie content type having a keyword of "horrible" or "horror." In this case, if there is no search result, search result is less than a certain number, or a user does not select a search result, the controller 120 may add the next priority—horror or eroticism—to a search keyword and resume the search.

As shown above, the server apparatus 100 may search for content information in various orders or methods, and transmit the search result to the display apparatus 200.

Type or quantity of data transmitted by the server apparatus 100 may vary according to exemplary embodiments. For example, according to an example, the controller 120 may transmit only content information to the display apparatus 200, and according to another example, may directly organize a content selection screen by using content information, and transmit the screen data to the display apparatus 200. In this case, the controller 120, according to priority of each content genre, may organize a screen with a layout which differently organizes display location, size, shape, color of content information by genres.

The controller 120, when one content information is selected at the display apparatus 200, may increase a score between a genre and a keyword of the corresponding content information as much as a certain degree. For example, when content information belonging to horror, comedy, eroticism genres is provided for a keyword "killing," if a user selects content information belonging to an eroticism genre, the controller 120 may add a preset value (for example, 0.1) to the score of eroticism genre 1.0. Accordingly, the score of eroticism genre increases to 1.1, and may be the top priority along with the horror genre.

Meanwhile, the controller 120, when it is determined that a keyword corresponding to the received text does not exist in the mapping table 131, may search for a synonym of the text. If the synonym is searched, the controller 120 searches for content information belonging to a content genre which corresponds to the synonym. The controller 120 may provide a search result to the display apparatus 200 through the communicator 110, and update the mapping table 131 by adding the synonym as a keyword.

For example, when there is the mapping table 131 as illustrated in, when a user mentions "a wicked movie," the controller 120 may search for the synonym of a text "wicked." As described above, the controller 120 may search for a synonym through an external apparatus, or search for a synonym by using its own database.

FIG. 4 is an example of a synonym database stored in the storage 130. According to FIG. 4, in the synonym database 132, a plurality of synonym groups may be included. Expressions which may be used in various meanings may be recorded along in a plurality of groups.

As described above, when a user mentions "a wicked movie," the controller 120 may know that there is a synonym of "wicked" such as "killing" and "awesome." The controller 120 may check that "killing" out of the synonyms is a keyword registered in the mapping table 131, and from among content genres (horror, comedy, melodrama, eroticism, and action) corresponding to the keyword, may provide content information belonging to a genre having a priority of a certain level or higher to the display apparatus 200 through the communicator 110.

The controller 120, when content information of an action genre is selected from among content information provided in relation to "wicked," may map a keyword "wicked" with an action genre and newly register at the mapping table 131. Accordingly, in the subsequent search, if the keyword "wicked" is included in a voice signal, a content genre may be selected with reference to a mapping table without searching for a synonym.

Figure 5:
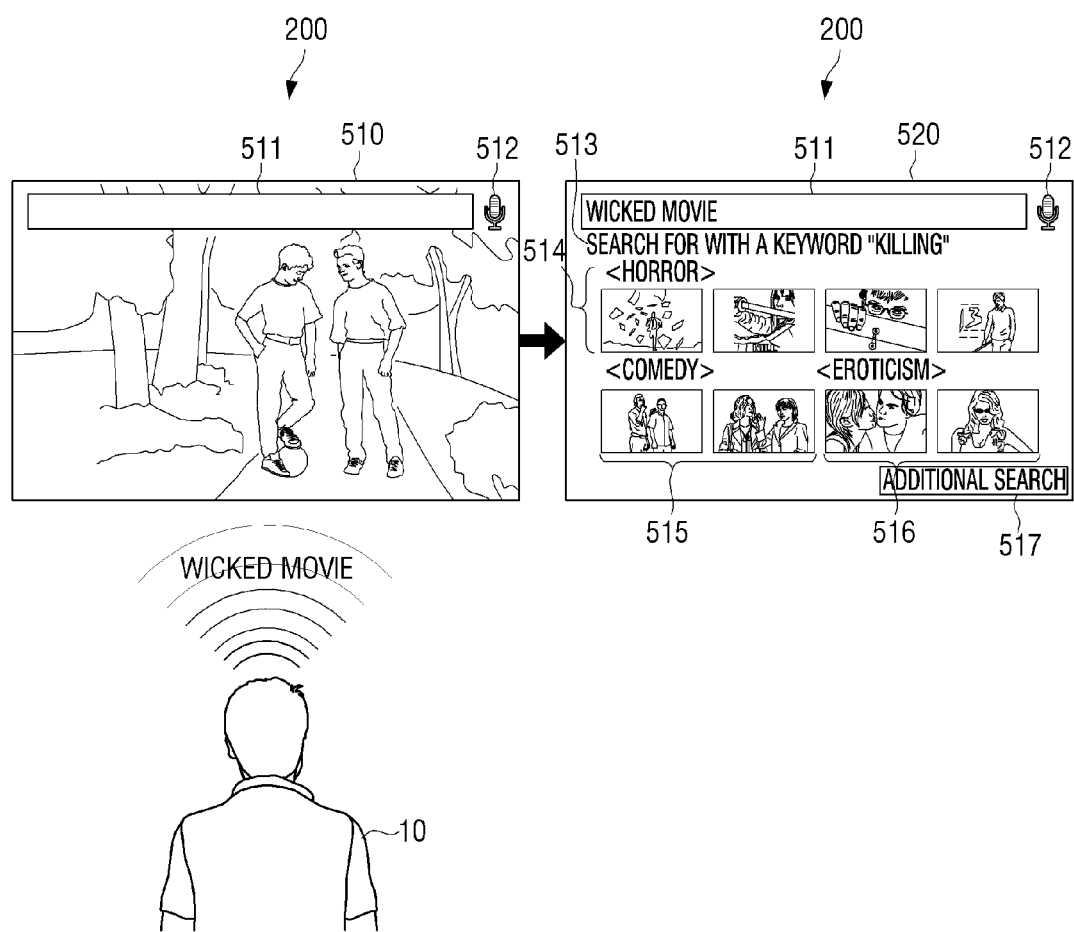
FIG. 5 is a view provided to explain a method for providing a content in a voice input system according to an exemplary embodiment.

FIG. 5 is a view provided to explain a method for providing content information according to an exemplary embodiment. According to FIG. 5, the display apparatus 200, when a voice input mode is executed, may display the screen 510 including a voice input window 511 and a guide image 512.

The guide image 512 may be expressed as a graphic object. In FIG. 5, it has been described the state where the guide image 512 in a microphone shape is displayed in a corner of a screen, but shape and location of the guide image 512 are not limited thereto.

The display apparatus 200, when a user's voice signal is input, displays a text which corresponds to the voice signal on the voice input window 511. As illustrated above, a text may be converted at the outside text conversion server 300 and provided to the display apparatus 200, but when the display apparatus 200 has voice recognition function, the display apparatus 200 itself may convert a voice signal into a text.

Accordingly, when a text which corresponds to user voice is displayed on the voice input window 511, a user may check whether or not voice which a user utters is normally recognized.

In FIG. 5, it has been illustrated that the voice input window 511 and the guide image 512 are displayed to be overlapped on the content screen 510 which the user 10 is currently viewing. However, according to another exemplary embodiment, the display apparatus 200, when converted to the voice input mode, may be converted to an exclusive control screen which corresponds to the voice input mode.

In this state, when the user 10 mentions "a wicked movie," the display apparatus 200 displays a result screen 520 thereof. When there is the mapping table 131 as illustrated in, the display apparatus 200 may display the search results 514, 515, and 516 using a keyword "killing" which is a synonym of "wicked." In this case, the display apparatus 200 may display a message 513 indicating that a related keyword is used for search. Meanwhile, when a keyword which the user 10 mentions exists in the mapping table 131, the message 513 may be omitted.

The search results 514, 515, and 516 may be expressed as various objects such as a thumbnail image, a text, and an icon. Further, the search results 514, 515, and 516 may be arranged and displayed in an order of higher priority from among content genres which correspond to a keyword (for example, killing). In FIG. 5, content information 514 of horror genre which has the top priority is displayed first, and content information 515 and 516 of comedy and eroticism genres having lower priority are displayed below. In addition, the number, size, color, display method of each content information 514, 515, and 516 may be displayed differently according to priority. For example, the content information 514 having the top priority may include both a thumbnail image and title information, and content information 515 and 516 having lower priority may have title information only.

Also, in a result screen 520, an additional search menu 517 may be included. The additional search menu 517 is a menu to additionally search and display content information on remaining content genres which are not displayed on the result screen 520 or other content information which is not displayed within a content genre which is currently displayed.

The display apparatus 200, when a user mentions a name of a specific content genre while the result screen 520 is displayed, may newly search for content information belonging to the content genre and display the new result screen.

In the above exemplary embodiments, it has been explained the mapping table 131 which maps a keyword and a content genre with each other, but the server apparatus 100 may search for a content which suits a user's intention by using another table on a content type. That is, in an exemplary embodiment of FIG. 5 the user 10 directly designates a content type "movie", but in the actual examples, the user 10 may not designate a specific type, but may mention an arbitrary demonstrative pronoun(for example, "thing"). For example, in the exemplary embodiment of FIG. 5, the user 10 may mention "wicked thing."

In this case, the server apparatus 100, by using a table which determines and registers priority for a content type, may forecast a content type which the user 10 wishes to view. FIG. 6 is an example of a content type table.

According to FIG. 6, in the content type table 133, information on the various content types such as a movie, a TV drama, news, a photograph, a music video, a music file, may be registered. The server apparatus 100 may allocate a score on each content type according to viewing numbers of the user 10. The score may be expressed as an accumulated score which accumulates a certain score according to viewing numbers, or as a ratio of viewing numbers of each content type. In FIG. 6, the case where a movie content has the highest score (2.0) is illustrated. The server apparatus 100 may set priority according to scores. Accordingly, the server apparatus 100, by not only combining the mapping table 131, the synonym table 132, but also the aforementioned content type table 133, may forecast content information which suits a voice signal of a user.

Figure 7:
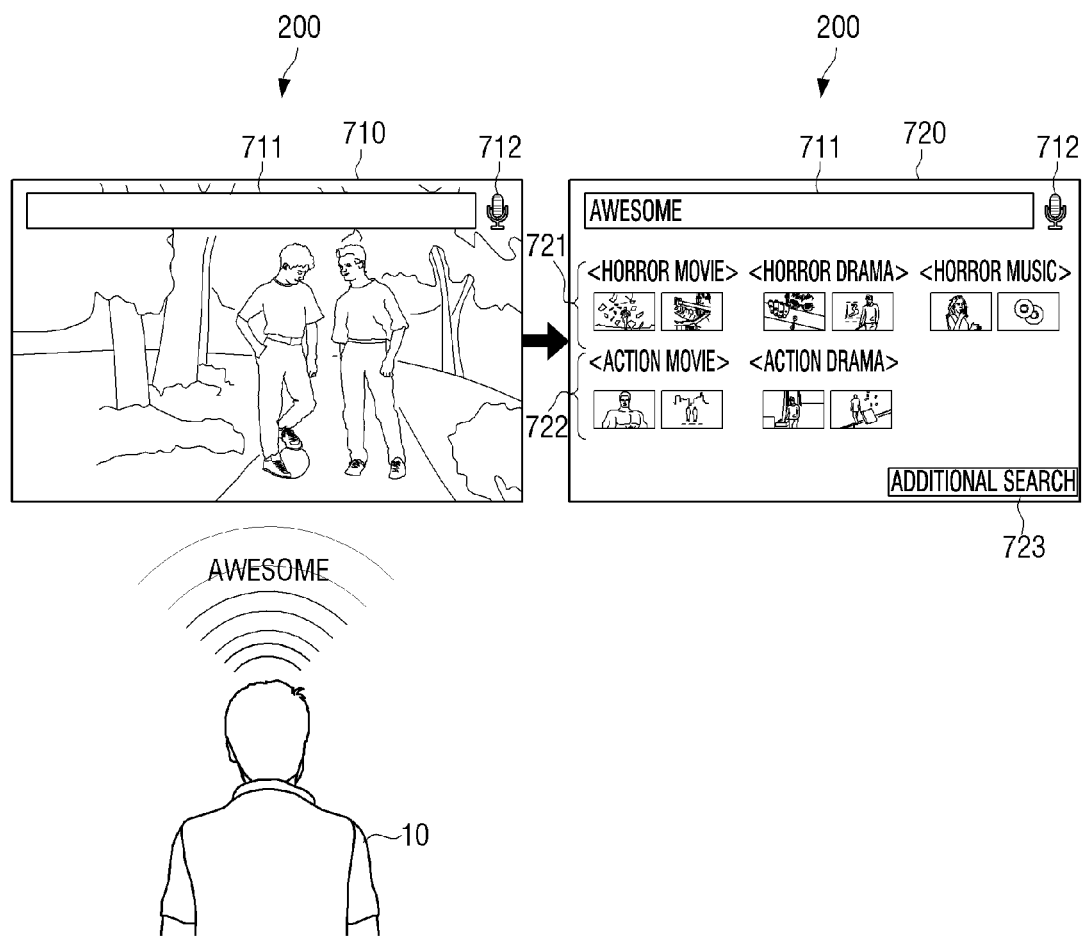
FIGS. 7 and 8 are views provided to explain a method for providing a content in a voice input system according to various exemplary embodiments.

FIG. 7 is a view provided to explain a method for providing content information according to the exemplary embodiment. According to FIG. 7, the display apparatus 200, when a voice input mode resumes, may display a screen 710 including a voice input window 711 and a guide image 712. For convenience of explanation, reference numerals different from FIG. 5 have been used, but the configurations of the screen 710 in the voice input mode may be the same as the exemplary embodiment of FIG. 5, and thus, further explanation will not be provided.

In this state, when the user 10 mentions "an awesome thing," the voice input system 1000 determines whether or not a keyword "awesome" exists in the mapping table 131. As a result of determination, when the keyword "awesome" does not exist, a synonym of "awesome" is searched from the synonym table 132, and a keyword corresponding to the searched synonym may be searched again from the mapping table 131. When the synonym table 132 which is illustrated in FIG. 4 is stored in the server apparatus 100, the server apparatus 100 may select "killing" as a synonym, and select at least one content genre which is mapped with "killing."

Further, the server apparatus 100, when a text "thing" is detected from a user's voice signal, may select at least one content type which corresponds to "thing" from the content type table 133. In this case, the server apparatus 100 may consider priority. For example, when the content type table 133 as illustrated in FIG. 6 is stored, and it is set that priority up to the 3rd priority should be selected, the server apparatus 100 may select a movie, a TV drama, and a music file as a content type which corresponds to "thing."

As a result, the server apparatus 100 may search for a movie, a TV drama, and a music file which corresponds to horror, comedy, and eroticism genres mapped with "killing" and provide the search result to the display apparatus 200.

According to FIG. 7, the display apparatus 200 displays a search result screen 720. In the search result screen 720, various search results 721, 722, and menu 723 may be displayed. FIG. 7 illustrates a search result 721 which searches for a movie, a drama, and a music file of a horror genre, and a search result 722 which searches for a movie and a drama of an action genre. The server apparatus 100 may set differently the number of a content type to be searched by priorities of a content genre. In FIG. 7, it has been described that the first, second, and third priority of a content type are searched in a horror genre having the top priority, and the first and the second priority of a content type are searched in an action genre having the next top priority, but the embodiment is not limited thereto. The server apparatus 100, when the user 10 selects an additional search menu 723, may search for content information of a genre or a type of the next priority, and may provide to the next screen.

In the above scenario, the example where a synonym is searched by using the synonym table 132 is explained, but as explained above, the server apparatus 200 may search for a synonym from the apparatuses connected through the Internet or another external network.

The server apparatus 100, when a signal of voice uttered by a user is not accurate, or a content genre which is mapped with a keyword included in the voice signal or a synonym thereof is not found, may provide a message screen indicating that the voice signal is not accurate, or a content is not found.

Figure 8:
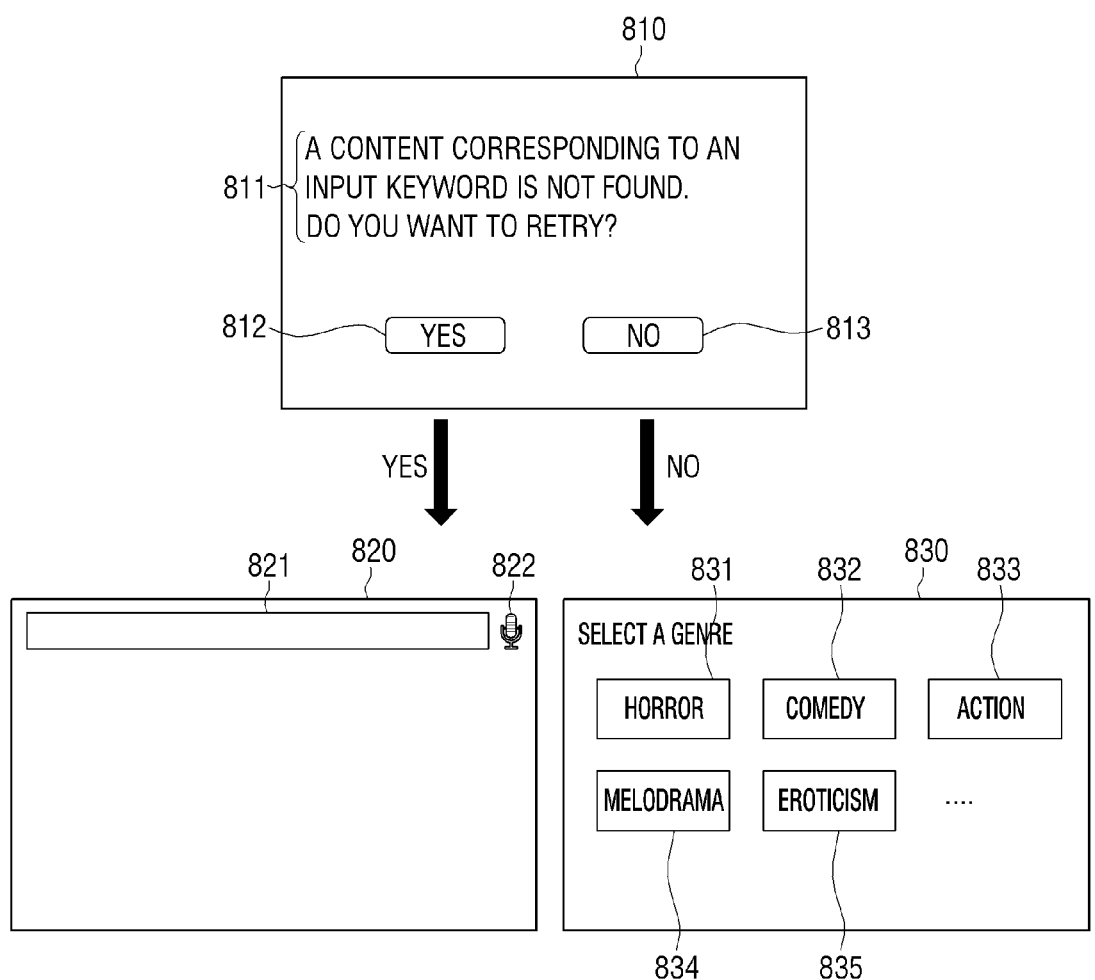

FIG. 8 is a view illustrating an example of an operation when a search is failed. According to FIG. 8, the display apparatus 100, when a content suitable for an input keyword is not searched, may provide a guide message screen 810.

In a guide message screen 810, a message 811 to notify a user of a search failure and to ask whether to conduct a re-search, and related menus 812 and 813, may be included. When the first menu 812 is selected from among the menus, the display apparatus 200 displays the voice input screen 820 again. In the voice input screen 820, the voice input window 821 and the guide image 822 may be included as described above.

On the other hand, the display apparatus 200, if a second menu 813 is selected, displays a selection screen 830 which may directly select a content genre. In the selection screen 830, information 831-835 on various content genres may be included. Each information 831-835 may be displayed as various shapes of objects such as an icon, a text, and an image.

In addition, according to still another exemplary embodiment, when there is no clear content search result, the server apparatus 100, based on a genre whose viewing frequency is high and content type information, may provide information on a recommended content.

As described above, the voice input system 1000 may provide content information in various methods.

Figure 9:
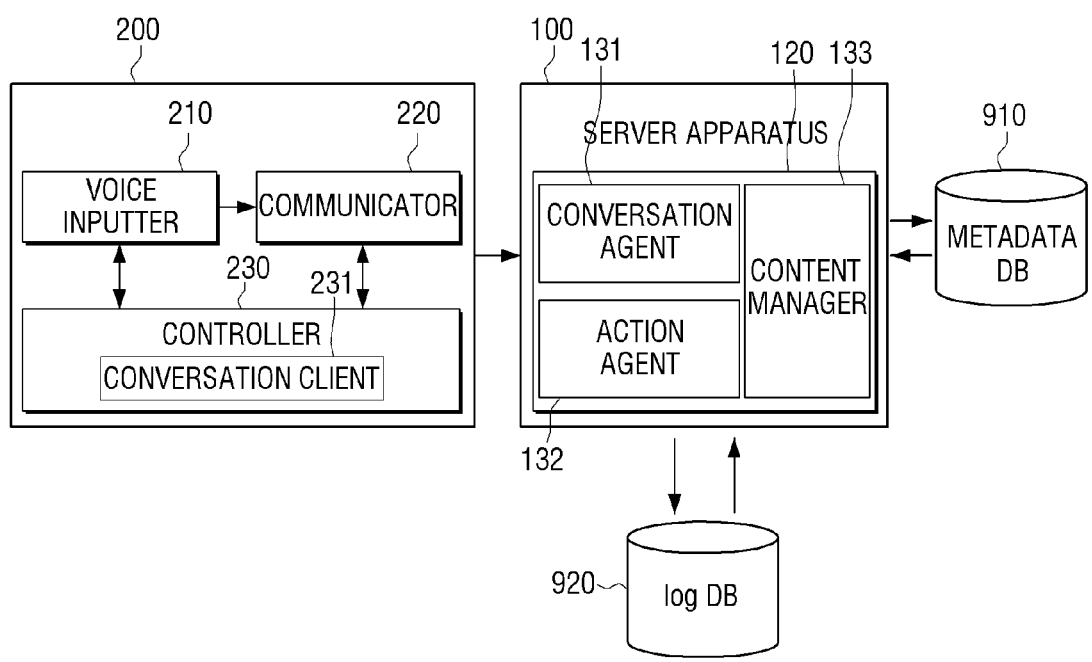
FIG. 9 is a block diagram provided to explain the detailed configurations and operations of a voice input system.

FIG. 9 is a view provided to explain the detailed configurations of a display apparatus and a server apparatus consisting of the aforementioned voice input system 1000, and the operations thereof.

According to FIG. 9, the display apparatus 200 includes a voice inputter 210, a communicator 220, and a controller 230.

The voice inputter 210 is an element that, when a user's voice signal is input, recognizes the voice signal and obtains text data. As described above, the display apparatus 200 may provide a voice signal to an external text conversion server 300, and obtain a text data corresponding to the voice signal, but the voice inputter 210 itself may process the voice signal and convert the signal to a text.

The controller 230 may execute the conversation client module 231 and perform communication with the server apparatus 100. The conversation client module 231 means a program which is installed in the display apparatus 200 to provide a conversation type service. The controller 230, when a voice input mode resumes, or initial booting is completed, may store the conversation client module 231 in the random access memory (RAM) (not illustrated), execute the module, and execute the above-described various voice search function.

To be specific, the controller 230 may organize a text obtained through the voice inputter 210 as a structured data in a format compatible with the server apparatus 100, and provide to the server apparatus 100 through the communicator 220.

The controller 120 of the server apparatus 100 may execute the conversation agent module 131, the action agent module 132, and the content manager module 133, and provide a conversation type service. To be specific, the conversation agent module 131, when a text data is transmitted from the display apparatus 200, may analyze an utterance factor of the transmitted text data and separate it into a user action slot, a domain slot, and a meaning unit slot, or the like. For example, when a user mentions "a horrible movie," the conversation agent module 131 may analyze the corresponding text as shown below.

user action: search_content
domain: all contents
target content platform: movie
genre: horrible, movie Herein, a user action means information on a function which a user intends to be executed, a domain means a search area, and a target content platform means a content type, etc. The conversation agent module 131 provides an analysis result to the action agent module 132.

The action agent module 132, by using each analyzed slot, generates a query required for content search. In this case, the action agent module 132 checks whether or not a keyword such as "horrible" and "movie" which correspond to a genre slot exist in a mapping table. If the keyword exists, a query may be prepared so that a content genre mapped with a keyword may be searched. A mapping table may be stored in a log DB 920. The log DB 920 is an element to store various data including a mapping table. The log DB 920 may separate and store data by display apparatuses or users. The log DB 920 may be provided within the storage 130 of the server apparatus 100, but is not limited thereto. That is, the log DB 920 may be stored in a storage which is separately provided outside the server apparatus 100.

The action agent module 132, if a corresponding keyword does not exist in a mapping table, searches for a synonym which corresponds to the keyword. The synonym, as described above, may be searched through its own synonym table or an external network. The action agent module 132 may prepare a query so that a content genre which corresponds to a searched synonym may be searched. As described above, a mapping table may be updated frequently. Accordingly, when the controller 120 further includes a table updater module (not illustrated), the table updater module may update a mapping table frequently according to a result of a search of a synonym of the action agent module 132. Whether or not the table updater module may be separately provided from the action agent module 132, and the update will be regularly performed separately from the conversation engine operations, or whether or not the table update will be performed on a real time basis, will be selectively realized, in consideration of an issue such as system speed. The action agent module 132 provides the generated query to the content manager module 133.

The content manager module 133 may search for content information in the metadata DB 910 by using a query. The metadata DB(910) means database in which various metadata provided by a content provider are recorded in relation to a content. The metadata DB 910 may be provided in a server apparatus (not illustrated) operated by a content provider, or may be provided in this server apparatus 100. Metadata may include various information such as a title of each content, abbreviation, nickname, a thumbnail image, a keyword, manufacturing date information, character information, summary information, and address information for a source from which the corresponding content may be obtained. The content manager module 133, when content information corresponding to each content genre is obtained in the metadata DB 910, may transmit the information to the conversation agent module 131.

The conversation agent module 131 may format the obtained search result as the structured data, and transmit the result to the conversation client module 231 of the display apparatus 200.

The controller 230 of the display apparatus 200, by using the transmitted search result, configures and displays a search result screen. A user may select one content genre from the displayed search result screen.

The conversation client module 231 notifies a value which corresponds to content information which a user selects to the conversation agent module 131 of the server apparatus 100. The conversation agent module 131, by using the transmitted value, updates a mapping table stored in the log DB 920. To be specific, the conversation agent module 131 may increase a score of a content genre which a user selects within a mapping table. Accordingly, for a future mapping table, priority is readjusted according to an amended score, and a search will be performed.

As described above, the log DB may provide a mapping table which reflects a user's selection result in a real time basis, but this is not limited thereto. For example, the mapping table may be updated and stored in accordance with a certain time cycle. Other tables aside from the mapping table may be updated in the same method.

In the aforementioned various exemplary embodiments, a method for providing content information performed in the voice input system 1000, but according to still another exemplary embodiment, this operation may be performed solely by the display apparatus 200.

Figure 10:
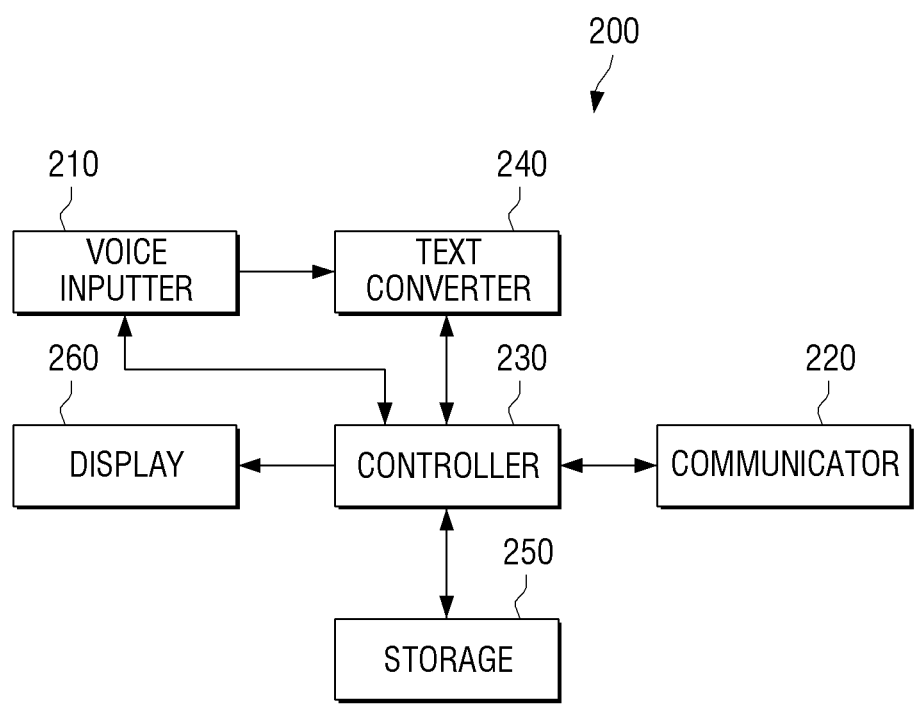
FIG. 10 is a block diagram illustrating the configuration of a display apparatus according to an exemplary embodiment, and, FIG. 11 is a flow chart provided to explain a method for providing content information according to an exemplary embodiment.

FIG. 10 is a block diagram illustrating the configuration of the display apparatus 200 according to an exemplary embodiment. For the elements which are the same as the elements in the aforementioned exemplary embodiments, the same reference numerals are used for convenience of explanation.

According to FIG. 10, the display apparatus 200 includes the voice inputter 210, the communicator 220, the controller 230, the text converter 240, the storage 250, and the display 260.

The voice inputter 210, as described above, is an element to receive the voice signal. The voice inputter 210 may include a microphone.

The communicator 220 is an element to perform communication with the aforementioned metadata DB or other external apparatuses. The communicator 220 may perform communication according to various wire/wireless communication methods such as Wi-Fi, Bluetooth, ZigBee, local area network (LAN), 3G, 4G, near field communication (NFC), or the like.

The text converter 240 is an element to convert the voice signal input through the voice inputter 210 into a text. The text converter 240 recognizes voice by using at least one of the aforementioned various recognition algorithms, and converts the voice into a text. The text converter 240 provides the converted text into the controller 230.

The controller 230 divides a text provided by the text converter 240 in a unit of a syllable, and detects an utterance factor by combining the each divided syllable. The controller 230 detects a part corresponding to a keyword from among the detected utterance factor.

The storage 250 is an element in which a program required for operation of the display apparatus 200 and various data, is stored. The storage 250 may store various tables such as the above-described mapping table, the synonym table, and the content type table.

The controller 230, when a keyword is extracted from among a user's voice signal, determines whether or not the keyword is the same as a keyword included in the mapping table stored in the storage 250 divided. As a result of the determination, when there is the same keyword, content information belonging to a content genre which is mapped to the keyword is searched from an external apparatus by using the communicator 220. On the other hand the controller 230, when a keyword which corresponds to a text does not exist from among a keyword included in the mapping table, may search for a synonym of a text and content information belonging to a content genre corresponding to the synonym from a server apparatus.

The display 260 may display content information searched from the controller 230. The display 260 may display various screens as illustrated in FIGS. 5, 7, and 8 according to control by the controller 230. The controller 230, by using a calculator (not illustrated) and a rendering unit (not illustrated), may generate various screens as illustrated in FIGS. 5, 7, and 8. The calculator calculates attribute values such as a coordinate value where each object is to be displayed, shape, size, and color according to a layout of a screen. The rendering unit, based on the attribute values calculated by the calculator, generates screens of various layouts including various objects such as an image, a text, and a photo. A screen generated by the rendering unit is provided to the display 260 and is displayed.

The controller 230, when search is performed based on the synonym, the synonym may be added as a keyword, and a mapping table may be updated. The updated mapping table may be stored in the storage 250.

Figure 11:
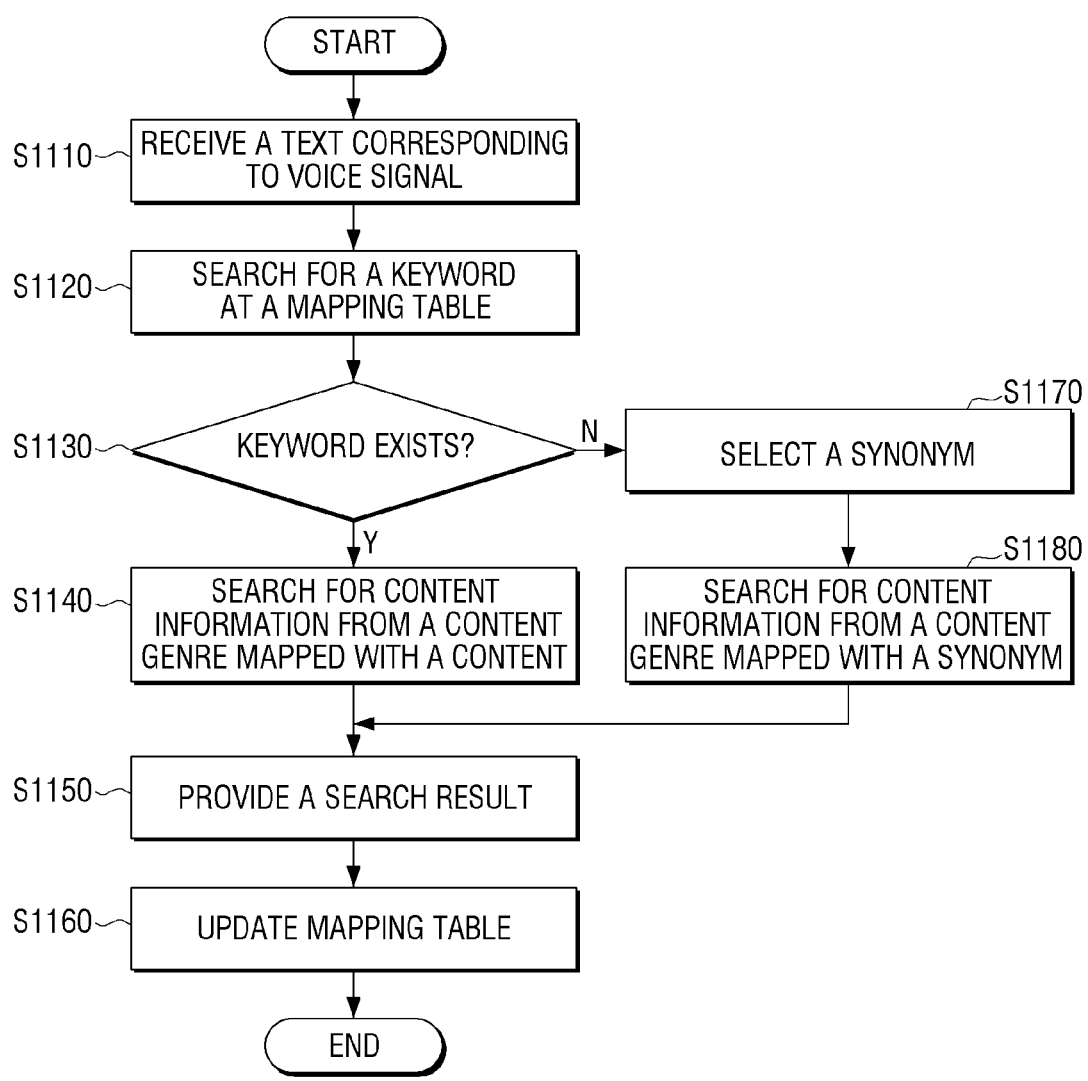

FIG. 11 is a flow chart provided to explain a method for providing content information of a server apparatus according to an exemplary embodiment. According to FIG. 11, a server apparatus may receive a text which corresponds to a voice signal input in the display apparatus (S1110). Depending on the exemplary embodiments, a text may be directly received from the display apparatus, or, may be received from the text conversion server.

The server apparatus, when a text is received, may determine whether or not there is a keyword which corresponds to a text in the prestored mapping table (S1120).

As a result of determination, when a keyword exists (S1130), the server apparatus may search for content information in a content genre which is mapped with a keyword (S1140), and provide the search result to the display apparatus (S1150). Then, when the content information is selected by a user at the display apparatus, the server apparatus updates the mapping table according to the selection state(S1160). To be specific, when content information provided to a user is selected, a score on a mapping relation of the selected content information and the content genre may be upwardly adjusted in a specific level size. For example, as illustrated in FIG. 3, when content information of a melodrama genre is selected for a voice expression "killing," the server apparatus may increase a score on killing-melodrama from 0.5 to 0.6.

On the other hand, when a keyword does not exist (S1130), the server apparatus may select a synonym on the text (S1170), and search for content information from a content genre mapped with the synonym (S1180). Accordingly, when a result of a search is obtained, the server apparatus may transmit the search result to the display apparatus (S1150).

The server apparatus, when a search based on a synonym is performed, may add the synonym as a keyword and update a mapping table (S1160). Further, as described above, when a user selects one content information at the display apparatus, a mapping table may be updated by upwardly adjusting a score on the selected content information.

In FIG. 11, a method for providing content information at the server apparatus is explained, but as described above, a method for providing content information may also be performed at the display apparatus. A flowchart and explanation on this will not be provided.

As described above, according to the various exemplary embodiments, when a user inputs a voice signal, content information in various content genres based on a keyword included in the voice signal may be provided. In particular, by using a flexible mapping table, a search may be performed focusing on a content genre or a content type which a user prefers. Accordingly, even if a user uses a language which a user arbitrarily changes, a search may be performed effectively. As a result, user satisfaction on the search result may be improved.

A program to execute a method for providing content information according to the above-described various exemplary embodiments may be stored in a non-transitory readable medium. The non-transitory readable medium may be provided on various apparatuses and used.

The non-transitory recordable medium refers to a medium which may store data semi-permanently rather than storing data for a short time such as a register, a cache, and a memory and may be readable by an apparatus. Specifically, the above-mentioned various applications or programs may be stored in a non-temporal recordable medium such as compact disc (CD), digital video disk (DVD), hard disk, Blu-ray disk, universal serial bus (USB), memory card, and read-only memory (ROM) and provided therein.

For example, a program code may be stored in a non-transitory readable medium and provided. The program code may perform: receiving a text which corresponds to a voice signal input at a display apparatus; searching for a keyword which corresponds to the text regarding a mapping table in which a keyword and a content genre are mapped with each other, in response to a keyword, which corresponds to the text, not existing; searching for content information belonging to the content genre mapped with a synonym of the text and transmitting a search result to the display apparatus; and updating the mapping table by adding the synonym as the keyword may be stored in a non-transitory readable medium and provided.

The foregoing embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the range of the claims, and many alternatives, modifications, and variations will be apparent to those skilled in the art.

What is claimed is:

1. A server apparatus, comprising:
    a communicator configured to receive a text which corresponds to a voice signal; and
    a controller configured to, in response to a keyword, which corresponds to the text, not existing from among at least one keyword included in a mapping table, search for content information belonging to a content genre mapped with a synonym of the text, provide a search result to a display apparatus through the communicator, and update the mapping table by adding the synonym as the keyword,
    wherein the mapping table is a table in which the at least one keyword, at least one content genre, and at least one priority score in combination are mapped, and
    wherein the controller, in response to a plurality of content genres being mapped with respect to the synonym, selects at least one content genre according to a priority determined with respect to the plurality of content genres, and searches for content information belonging to the selected at least one content genre.

2. The apparatus as claimed in claim 1, wherein the controller, according to a number related to user selection of content information belonging to the at least one content genre, adjusts a score of the plurality of content genres, and updates the mapping table by re-setting the priority according to the adjusted score.

3. The apparatus as claimed in claim 1, wherein the controller, in response to the keyword, which corresponds to the text, existing from among the at least one keyword registered in the mapping table, searches for content information belonging to a content genre mapped with the keyword and provides the content information to the display apparatus, and upwardly adjusts a score of the content genre mapped with the keyword.

4. The apparatus as claimed in claim 1, wherein the mapping table is a mapping table which is individually generated and stored for a plurality of pre-registered users,
    wherein the controller receives via the display apparatus user information which inputs the voice signal, and searches for the content information based on the mapping table which corresponds to the user information.

5. The apparatus as claimed in claim 1, further comprising a storage configured to store the mapping table.

6. The apparatus as claimed in claim 1, wherein the voice signal is input at the display apparatus.

7. A method for providing content information of a server apparatus, the method comprising:
    receiving a text which corresponds to a voice signal;
    searching for a keyword which corresponds to the text at a mapping table in which at least one keyword, at least one content genre, and at least one priority score in combination are mapped;
    in response to the keyword, which corresponds to the text, not existing, searching for content information belonging to the content genre mapped with a synonym of the text and transmitting a search result; and
    updating the mapping table by adding the synonym as the keyword,
    wherein the transmitting the search result to the display apparatus comprises:
    in response to a plurality of content genres being mapped with respect to the synonym, selecting at least one content genre according to a priority determined regarding the plurality of content genres; and searching content information belonging to the at least one selected content genre and transmitting the search result to the display.

8. The method as claimed in claim 7, further comprising:
according to a number related to user selection of content information belonging to the at least one content genre, adjusting a score of the plurality of content genres and updating the mapping table by re-setting the priority according to the adjusted score.

9. The method as claimed in claim 7, further comprising:
in response to the keyword, which corresponds to the text, existing from among keywords registered in the mapping table, providing content information belonging to the content genre mapped with the keyword to the display apparatus, and upwardly adjusting a score of the content genre mapped with the keyword.

10. The method as claimed in claim 7, wherein the mapping table is a mapping table which is individually generated and stored for a plurality of pre-registered users.

11. The method as claimed in claim 7, wherein the voice signal is input at the display apparatus.

12. A voice input system, comprising:
a display apparatus configured to receive a voice signal;
a text conversion server configured to, in response to the voice signal being transmitted from the display apparatus, convert the voice signal to a text; and
a server apparatus configured to search for content information corresponding to the text using a mapping table in which at least one keyword, at least one content genre, and at least one priority score in combination are mapped, and provide the information,
wherein the server apparatus, in response to the keyword, which corresponds to a text, not existing at the mapping table, searches for content information belonging to a content genre which corresponds to a text synonym, provides a search result, and updates the mapping table by adding the synonym as the keyword,
wherein the server apparatus, in response to a plurality of content genres being mapped with respect to the synonym, selects at least one content genre according to a priority determined with respect to the plurality of content genres, and transmits content information belonging to the selected at least one content genre.

13. The system as claimed in claim 12, wherein the display apparatus displays the content information, and in response to the at least one content information being selected, notifies the selected at least one content information to the server apparatus,
wherein the server apparatus adjusts a score on a content genre to which the selected content information belongs, according to the notice of the display apparatus and updates the mapping table.

14. The system as claimed in claim 12, wherein the server apparatus, in response to the keyword, which corresponds to the text, existing from among keywords registered in the mapping table, provides content information belonging to the content genre mapped with the keyword to the display, and upwardly adjusts a score of the content genre mapped with the keyword.

15. The system as claimed in claim 12, wherein the mapping table is a mapping table which is individually generated and stored for a plurality of pre-registered users, and
wherein the server apparatus receives at the display apparatus user information related to the voice signal, and searches for the content information based on the mapping table which corresponds to the user information.

16. A display apparatus, comprising:
a voice inputter configured to receive a voice signal;
a text converter configured to convert the voice signal to a text;
a communicator configured to perform communication with an external apparatus;
a controller configured to, in response to a keyword, which corresponds to the text from among at least one keyword included in a mapping table, existing, search for content information belonging to a content genre mapped with the keyword via the external apparatus, and in response to a keyword, which corresponds to the text from among the at least one keyword included in the mapping table, not existing, the controller is configured to search for a synonym of the text and search for content information belonging to the content genre corresponding to the synonym from the external apparatus; and
a display configured to display the content information,
wherein the controller, in response to a search being performed based on the synonym, adds the synonym as the keyword and updates the mapping table, and
wherein the mapping table is a table in which the at least one keyword, at least one content genre, and at least one priority score in combination are mapped,
wherein the controller, in response to a plurality of content genres being mapped with respect to the synonym, selects at least one content genre according to a priority determined with respect to the plurality of content genres.

17. The apparatus as claimed in claim 16, further comprising a storage configured to store the mapping table.

* * * * *